June 8, 1965   W. M. ASHLEY, JR., ETAL   3,187,845
BRAKE CONTROL MECHANISM FOR BRAKE STEERING
Filed Feb. 4, 1963
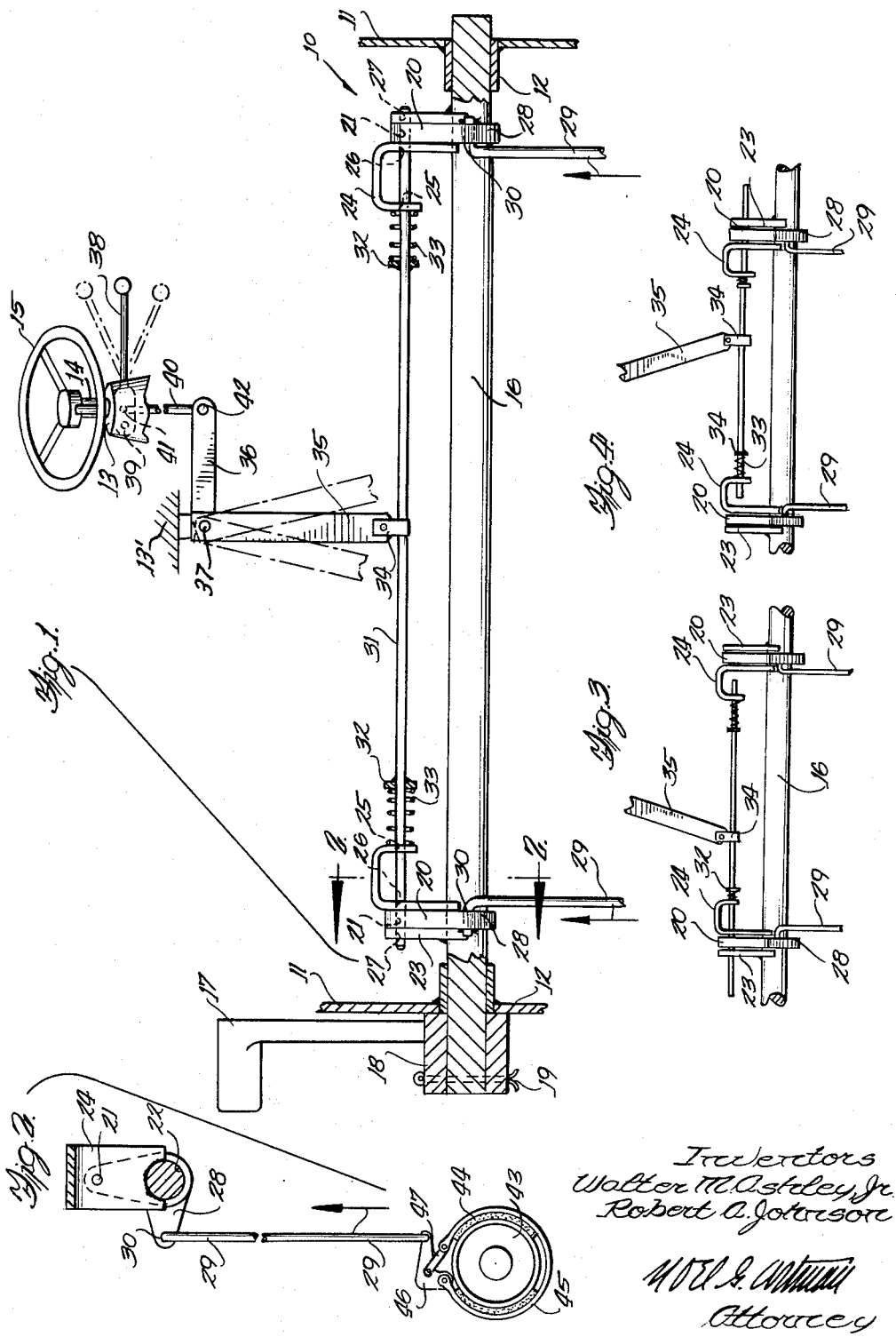
Inventors
Walter M. Ashley, Jr.
Robert C. Johnson
Attorney United States Patent Office 3,187,845
Patented June 8, 1965

3,187,845
BRAKE CONTROL MECHANISM FOR BRAKE STEERING
Walter M. Ashley, Jr., Glen Ellyn, Ill., and Robert A. Johnson, Lexington, Ky., assignors to International Harvester Company, Chicago, Ill., a corporation of New Jersey
Filed Feb. 4, 1963, Ser. No. 256,037
6 Claims. (Cl. 188—16)

This invention relates to an improvement in a brake control mechanism. More particularly the invention relates to an improved one-pedal brake system for braking and steering a vehicle.

In conventional farm tractors, the rear wheels may be individually braked to assist steering. In constructions of this type the brakes of each rear wheel are connected by means of suitable braking linkages to separate pedals and the operator during straight-line movement will actuate both brakes by simultaneously stepping on both of the brake pedals. In this manner braking of both wheels is achieved. Interlocks between the individual brake pedals may also be provided so that upon stepping of one pedal by the operator, both brake pedals are actuated and thus braking is effected of both brakes. When it is desired to utilize the brakes to assist steering to the left or to the right the operator may then press only one of the pedals, upon disconnection of the interlock, and thus, for instance, by setting the left hand brake, steering to the left is assisted or by setting of the right hand brake, steering to the right is assisted. The present invention has to do with an improved control mechanism for accomplishing both the braking function and the desired steering assist by braking wherein the same can be achieved by a selective control means positioned on the control column of the conventional front-wheel steering mechanism.

It is therefore a prime object of this invention to provide an improved and simplified control mechanism for braking and steering of a vehicle such as a farm tractor.

Another object is to provide an improved control mechanism wherein the operator can quickly select one or the other of his left or right hand brakes for steering purposes or can by simple manipulation retain the brakes in position for conventional braking and wherein only one brake pedal is required for both wheels during conventional braking and for braking to assist steering.

A still further object is the provision of an improved braking and steering control mechanism wherein the braking and steering control is readily achieved by the manipulation of a lever within easy reach of the operator.

A still further object is the provision of a one-pedal brake control for braking both of the rear brakes of a tractor during regular braking operation, said one pedal also being effective for braking selectively either of said brakes independently upon selection by the operator.

A still further object of the invention is to provide an improved brake control mechanism for braking a two-brake vehicle, the said mechanism also including selective control means operable to permit braking of either of the two rear wheels of a tractor by means of a single lever for steering purposes, and also being operable to return said brake to the normal non-steering operating position after one or the other of said brakes has been utilized for such steering purposes.

These and other objects will become more readily apparent from a reading of the description when examined in connection with the accompanying sheet of drawing.

In the drawing:

FIGURE 1 is a plan view of a brake control mechanism showing schematically portions of an operator's station of a type used in connection with vehicles such as a tractor;

FIGURE 2 is a cross sectional view taken substantially along line 2—2 of FIGURE 1 also showing a simple conventional band-type brake, one of which may be used on each of the rear wheels of a conventional tractor;

FIGURE 3 is a reduced detail plan view similar to FIGURE 1 showing one position of a brake control mechanism where the left hand brake of a vehicle may be actuated for braking action; and FIGURE 4 is a view similar to FIGURE 3 showing a second position of a brake control mechanism wherein the right hand brake of a vehicle is actuated for braking action.

Referring now to FIGURE 1, a brake control mechanism is generally designated by the reference character 10. The brake mechanism 10 is suitably incorporated in a vehicle such as a tractor, which is not shown in detail since the invention concerns the brake control mechanism per se. Transversely spaced support members are designated at 11 and these support members 11 may extend longitudinally underneath the body of a conventional tractor. The support members 11 each support a bearing 12, the said bearings being transversely aligned. A support 13 is provided near the operator's station of a tractor and a steering column 14 and steering wheel 15 are suitably supported on said support 13. The bearings 12 support for rotation a transversely extending shaft 16 which may be turned or rotated by means of a single brake pedal 17 having a collar 18 which is keyed to the shaft 16 by means of a suitable key 19. A pair of transversely spaced L-shaped levers is designated at 20, the said levers having openings 21 and an enlarged opening 22 through which the shaft 16 extends. The levers 20 are thus rotatable on the shaft 16. A fixed arm 23 is fixedly secured to the shaft 16 immediately adjacent and outwardly of each of the levers 20. A U-shaped guide member 24 is fixedly connected to the shaft 16 inwardly of and adjacent each of the levers 20. The U-shaped guide members 24 each has transversely aligned openings 25 and 26, the said openings being registerable with the openings 21 of the levers 20. The fixed arms 23 likewise have openings 27 which are registerable with the openings 21, 25 and 26.

Each lever 20 is also provided with a lever portion 28 to which a link 29 is pivotally connected as indicated at 30. The links 29 extend rearwardly to portions of a brake mechanism which will presently be described.

A rod 31, as best shown in FIGURE 1, is positioned substantially parallel to the shaft 16, the said rod 31 comprises a pair of laterally spaced collars 32 which is rigidly secured to the rod 31 and springs 33 are held captive between the collars 32 and the U-shaped guide members 24. The springs 33 are of equal predetermined tension so as to urge the rod 31 at all times into the position shown in FIGURE 1.

A central portion of the rod 31 is rigidly connected to a strap 34 which is pivotally connected to a link 35 which in turn is rigidly secured to a link 36. This rigid connection is pivotally mounted as indicated at 37 to a support 13'. A shift lever 38 pivoted on support 13 about pivot point 39 has connected thereto a link 40 for pivotal movement as indicated at 41, the said link 40 also being pivotally connected as indicated at 42 to the link 36.

FIGURE 2, taken along the line 2—2 of FIGURE 1, shows one side of the control mechanism leading to a conventional brake drum indicated at 43. It is to be understood that the opposite side is of identical construction since both the left and right hand wheels (not shown) are each braked by a brake drum 43. Each brake drum 43 comprises suitable brake linings 44, and a brake band 45 which is adapted to be drawn about the drum 43 by means of a pivotal link 46 suitably connected to a link 47 in turn pivotally connected to one end of the brake band 45.

In the operation of the tractor, the control mechanism is in the normal position shown in FIGURE 1. Since the rod 31 extends through the openings 25, 26, 21 and 27, the levers 20 are each locked to the shaft 16 for rotation therewith. During normal operating conditions if the operator wishes to brake the wheels of the tractor he thereupon merely steps upon the brake pedal 17 whereupon the shaft 16 is rotated and the links 29 are moved in the direction of the arrow in FIGURES 1 and 2 for tightening the brake band around the drum 43 and thus braking is achieved. The position of the shift lever 38, during this normal operation, is as indicated in solid lines in FIGURE 1. Supposing now that the operator wishes to steer sharply to the left and desires to utilize the control mechanism so as to set the left hand brake and thus assist steering, he merely pushes downwardly on the shift lever 38 whereupon the rod 31 is moved sufficiently far to the left as indicated in FIGURE 3. Since the rod 31 is in locking engagement with respect to the lever 20 and fixed arm 23 on the left side, the left hand brake drum 43 is now engaged in braking relation. On the other hand the rod 31 has been moved out of locking engagement with respect to the lever 20 so that the shaft 16 is free to rotate relative to the right hand lever 20 and thus the right hand brake is not affected.

If the operator wishes to turn sharply to the right he merely moves the shift lever 38 upwardly whereupon, as indicated in FIGURE 4, braking is achieved only on the right hand brake drum since now the left hand lever 20 is disengaged and only the right hand lever 20 is actuated for locking of the right hand brake.

Thus it is believed clear that only a single brake lever need be utilized for braking both of the brake drums during normal operation. The springs 33 are effective, upon release of the pedal 17, by the operator, to return the rod 31 to its normal position, shown in FIGURE 1, without any further effort on part of the operator. Thus the springs 33 center the rod 31 immediately upon release of the lever 17 and the lever 38 is returned to the position shown in full lines in FIGURE 1. Thus, the operator is automatically assured of return of the mechanism to its normal condition, without any further effort, after the brakes have been used for steering to the left or to the right. In the event of a desired quick turn and quick braking action on one side the shift lever 38 can quickly be actuated to achieve the steering by braking action.

Thus the objects of the invention have been fully achieved and it must be understood that changes and modifications may be made without departing from the spirit of the invention as disclosed or from the scope thereof as defined in the appended claims.

What is claimed is:

1. A selective brake control mechanism for a vehicle including a plurality of brake drums and a brake actuating member for each drum comprising:
   (a) a pair of transversely spaced horizontally extending supports,
   (b) a shaft extending between and rotatably carried on said supports,
   (c) a brake pedal connected to said shaft adapted to be engaged by the operator for rotating the same,
   (d) a plurality of transversely spaced first levers rotatably carried on said shaft adapted to rotate with respect thereto,
   (e) said first levers having first transversely aligned openings,
   (f) a plurality of second levers connected to said shaft for rotation therewith, a second lever being positioned adjacent each first lever,
   (g) said second levers each having a second opening adapted to register with each first opening,
   (h) a plurality of guide elements connected to said shaft for rotation therewith,
   (i) said guide elements each having an opening adapted to register with the first and second openings,
   (j) a transversely extending rod carried in the openings of said guide elements,
   (k) said rod in one position extending through all said openings wherein said first levers are secured for rotation with said shaft,
   (l) linkage means connected to each first lever and to each said actuating member whereupon rotation of said shaft said brake actuating members are adapted to be actuated,
   (m) means connected to said rod for selectively moving the same laterally in opposite directions to second positions to disengage the rod from one or the other of said first and second levers whereby only one of said first levers is rotated upon rotation of said shaft, and
   (n) resilient means between said guide elements and said rod for returning said rod to said first position.

2. A selective brake control mechanism for a vehicle including a plurality of brake drums and a brake actuating member for each drum comprising:
   (a) a pair of transversely spaced horizontally extending supports,
   (b) a shaft extending between and rotatably carried on said supports,
   (c) a brake pedal connected to said shaft adapted to be engaged by the operator for rotating the same,
   (d) a plurality of transversely spaced first levers rotatably carried on said shaft adapted to rotate with respect thereto,
   (e) said first levers having first transversely aligned openings,
   (f) a plurality of second levers connected to said shaft for rotation therewith, a second lever being positioned adjacent each first lever,
   (g) said second levers each having a second opening adapted to register with each first opening,
   (h) a plurality of guide elements connected to said shaft for rotation therewith,
   (i) said guide elements each having an opening adapted to register with the first and second openings,
   (j) a transversely extending rod carried in the openings of said guide elements,
   (k) said rod in one position extending through all said openings wherein said first levers are secured for rotation with said shaft,
   (l) linkage means connected to each first lever and to each said actuating member whereupon rotation of said shaft said brake actuating members are adapted to be actuated, and
   (m) means connected to said rod for selectively moving the same laterally in opposite directions to second positions to disengage the rod from one or the other of said first and second levers whereby only one of said first levers is rotated upon rotation of said shaft.

3. A selective brake control mechanism for a vehicle including a plurality of brake drums and a brake actuating member for each drum comprising:
   (a) a pair of transversely spaced horizontally extending supports,
   (b) a shaft extending between and rotatably carried on said supports,
   (c) means connected to said shaft for rotating the same,
   (d) a plurality of transversely spaced first levers rotatably carried on said shaft adapted to rotate with respect thereto,
   (e) said first levers having first transversely aligned openings,
   (f) a plurality of second levers connected to said shaft for rotation therewith,
   (g) said second levers each having a second opening adapted to register with each first opening,
   (h) guide means connected to said shaft for rotation therewith, (i) said guide means having an opening adapted to register with the first and second openings, (j) a transversely extending rod carried in the opening of said guide means, (k) said rod in one position extending through all said openings wherein said first levers are secured for rotation with said shaft, (l) means connected to each first lever and to each said actuating member whereupon rotation of said shaft said brake actuating members are adapted to be actuated, and (m) means connected to said rod for selectively moving the same laterally in opposite directions to second positions to disengage the rod from one or the other of said first and second levers whereby only one of said first levers is rotated upon rotation of said shaft.

4. A brake control mechanism for a vehicle including a plurality of brake drums and a brake actuating member for each drum comprising:

(a) a support, (b) a shaft rotatably carried on said support, (c) means connected to said shaft for rotating the same, (d) a plurality of levers supported on said shaft for relative rotation, (e) said levers having openings, (f) a plurality of arms fixedly carried on said shaft, (g) said arms each having an opening adapted to register with openings of said levers, (h) a guide member on said shaft, (i) a rod supported on said guide member for shifting movement in laterally opposed directions, (j) said rod in one position engaging the openings of said arms and levers whereupon rotation of said shaft said levers are moved, (k) means connecting said levers to said brake actuating members for actuating the same during rotation of said shaft, (l) means connected to said rod for shifting the same in one direction whereby the openings of only one of said levers and arms are engaged by said rod, and the shaft rotates relative to said other lever, (m) and means between said guide members and said rod for returning said rod to said first position.

5. A brake control mechanism for a vehicle including a plurality of brake drums and a brake actuating member for each drum comprising:

(a) a support, (b) a shaft rotatably carried on said support, (c) means connected to said shaft for rotating the same, (d) a plurality of levers supported on said shaft for relative rotation, (e) said levers having openings, (f) a plurality of arms fixedly carried on said shaft, (g) said arms each having an opening adapted to register with openings of said levers, (h) a guide member on said shaft, (i) a rod supported on said guide member for shifting movement in laterally opposed directions, (j) said rod in one position engaging the openings of said arms and levers whereupon rotation of said shaft said levers are moved, (k) means connecting said levers to said brake actuating members for actuating the same during rotation of said shaft, and (l) means connected to said rod for shifting the same in one direction whereby the openings of only one of said levers and arms are engaged by said rod, and the shaft rotates relative to said other lever.

6. A brake control mechanism for a vehicle including a plurality of brake drums and brake actuating means for each drum comprising, a support, a shaft rotatably carried on said support, means for rotating said shaft, a plurality of levers rotatably positioned on said shaft to rotate with respect thereto, means connecting said levers to said actuating means whereby said actuating means may be moved to brake said drums, a plurality of arms fixedly carried on said shaft adapted to be connected one to each of said levers for locking said levers to said shaft for rotation therewith whereby said actuating means are actuated, and rod means selectively movable laterally for disconnecting one of said levers from one of said fixed arms to render the same inoperative during rotation of said shaft.

References Cited by the Examiner

UNITED STATES PATENTS 1,224,826 5/17 Wiser _____ 188—16
2,591,171 4/52 Lohse _____ 188—16 X

FOREIGN PATENTS 209,062 6/40 Switzerland.

EUGENE G. BOTZ, Primary Examiner.

DUANE A. REGER, ARTHUR L. LA POINT,
Examiners.